United States Patent

[11] 3,563,332

[72] Inventor Harry D. Sturdy
 Hagerstown, Ind.
[21] Appl. No. 798,285
[22] Filed Feb. 11, 1969
[45] Patented Feb. 16, 1971
[73] Assignee Dana Corporation,
 Toledo, Ohio

[54] UPPER SPEED LIMITING DEVICE
 12 Claims, 3 Drawing Figs.

[52] U.S. Cl. .................................................. 180/108;
 123/103
[51] Int. Cl. .................................................. B60k 31/00
[50] Field of Search ........................................ 180/105-
 −110; 123/97, 102, 103, 140; 137/47

[56] References Cited
 UNITED STATES PATENTS
| | | | | |
|---|---|---|---|---|
| 2,260,576 | 10/1941 | Maybach | | 123/102 |
| 2,379,945 | 7/1945 | Wyatt | | 123/103 |
| 2,525,653 | 10/1950 | Darnell | | 123/140 |
| 2,671,542 | 3/1954 | Robnett | | 123/103X |
| 2,861,559 | 11/1958 | Reiners | | 123/103X |
| 2,911,054 | 11/1959 | Malecki et al. | | 180/107 |
| 2,945,547 | 7/1960 | Bunker | | 123/103X |
| 2,972,390 | 2/1961 | Bunker et al. | | 123/103X |

*Primary Examiner*—Kenneth H. Betts
*Attorneys*—Walter E. Pavlick, Harold D. Shall, John F. Teigland and Richardson B. Farley

ABSTRACT: An upper speed control unit is provided which utilizes a modulated pressure to obtain throttle control. The speed sensing portion of the upper speed limiting unit is directly connected to the valving arrangement providing modulating pressure to a throttle actuating bellows. A spring means calibrated for the specific maximum speed acts against the speed sensing means to insure that the modulated pressure provided for the bellows activates the throttle to a closed position only upon the vehicle's reaching the maximum set speed.

Patented Feb. 16, 1971

3,563,332

INVENTOR.
HARRY D. STURDY
BY Richardson B Farley

ATTORNEY

UPPER SPEED LIMITING DEVICE

This invention relates generally to speed control devices and more particularly to an improved and simplified upper speed limiting unit providing extremely close control and limitation of a vehicle's maximum speed, the same being accomplished by a pressure modulated means.

Although prior speed control devices providing for upper limitation of vehicle speed have been designed which utilized a pressure modulated fluidic means, such as engine manifold pressure modified by atmospheric pressure or modulated low pressure from the transmission or engine as a source to control throttle setting, no such prior art devices are known which utilize a simplified mechanical readout speed sensing means which is directly connected to drive a valve plate, said valve plate communicating with a simplified porting arrangement to provide a modulated pressure signal for an operator bellows to enable the bellows to move the throttle valve of the vehicular carburetor to a closed throttle position immediately upon the vehicle reaching the maximum set speed. Further, no such upper speed limiting device is known wherein the number of components is so minimized or wherein access for maintenance and repair is made so easy.

It is, therefore, an object of this invention to provide an upper speed limiting unit with a precalibrated spring set for maximum speed and disposed so as to oppose the force imposed by the mechanical speed sensing means.

It is an additional object of the invention to provide an upper speed limiting unit wherein the speed sensing means s directly link connected with the valving means which provides a mixed modulating pressure to the carburetor throttle plate bellows actuating means.

It is a still further object of the invention to provide a simplified valving arrangement for the upper speed limiting unit wherein a single valve plate having a passageway means therein provides communication between a manifold vacuum source, an atmospheric air source and an operating bellows.

It is a still further object of the invention to provide passageway and porting arrangements for a manifold vacuum source, an air pressure source and a bellows for actuating a throttle plate by a single platelike valve means and a backup plate comprising a portion of the assemblage of the upper speed limiting unit.

It is a still further object of the invention to provide an upper speed limiting unit which is easily manufactured, contains a minimum of components and is thereby easily serviced and maintained.

Other and additional objects of this invention will appear and become obvious upon a reading of the detailed description of the invention and a review of the appendant drawings in which.

Figure 1:
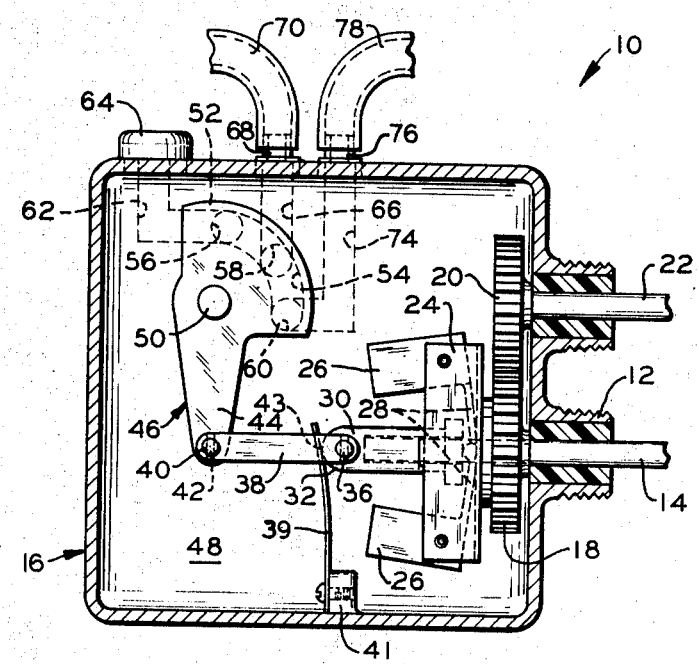
FIG. 1 is a plan view of the upper speed limiting unit with the cover shown in cross section.
Figure 2:
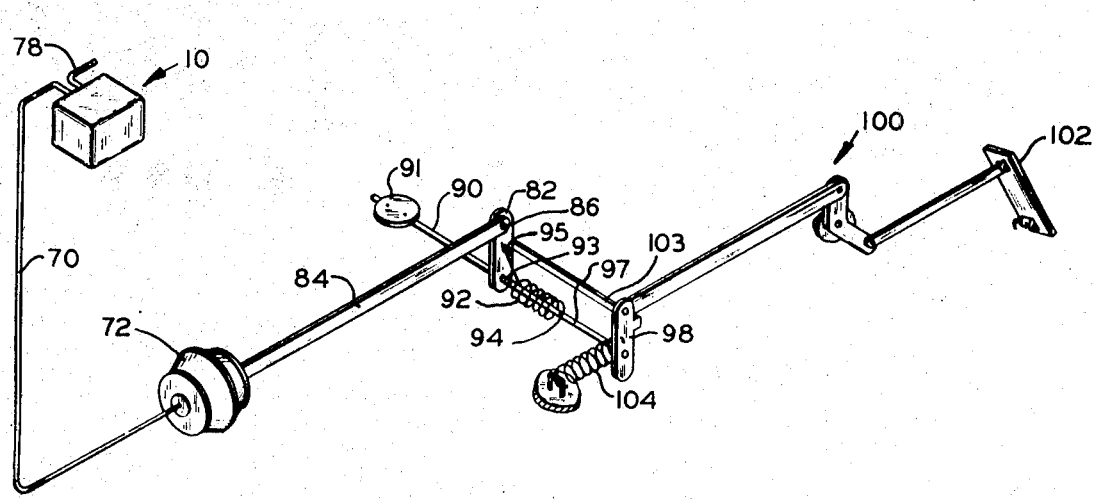
FIG. 2 is a view, shown somewhat schematically, of the connection of the upper speed limiting unit to the operating bellows and vehicle throttle control arrangement.
Figure 3:
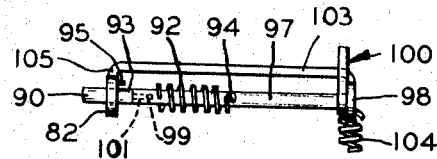
FIG. 3 is a plan view of the arrangement of the carburetor shafts and associated linkage.

The instant invention generally discloses an upper speed limiting unit wherein a pair of pivoted weights are mounted so as to rotate at a speed dictated by the speed of the vehicle and are thereby pivoted outwardly due to the centrifugal force of their rotation to actuate a thrust link in a generally linear direction, the thrust link being opposed in its outward movement by a precalibrated spring set for the desired upper speed of the vehicle. The thrust link is pivotally attached to a valve plate to drive it, with the valve plate pivotally mounted in the upper speed limiting unit. Movement of the valve plate arcuately, controls the modulated pressure provided to an operating bellows by the following structural arrangement. The valve plate contains on its most remote side an arcuately extending channel. Disposed behind this channel is a platelike member with a series of three ports. These three ports communicate respectively with a manifold vacuum supply, an operating bellows and air supply. Movement of the valve plate in a clockwise direction, as the speed of the vehicle increases, causes a reduction in the amount of atmospheric pressure supplied to the operating bellows. Upon continued clockwise movement of the valve plate the supply of air pressure through its port is completely cut off so that only a vacuum pressure is provided to the operating bellows. This vacuum or negative pressure causes the operating bellows to move in a direction that urges the carburetor throttle plate in a counterclockwise direction towards a closed throttle position. The throttle plate is resiliently mounted on a shaft extending outwardly of the carburetor by means of a torsion spring so that actuation of the throttle pedal by the vehicle operator to an accelerated position does not, in the event that the bellows is actuated to a throttle closed position, affect the position of the carburetor valve plate.

Referring now specifically to the drawings, the upper speed limiting unit is shown generally at 10 and includes a fitting 12 through which a shaft 14 extends. This shaft may be attached to a speedometer cable or a cable that extends to the transmission in the following manner. Shaft 14 extends through the fitting 12 inwardly of a case 16 that forms the housing for the upper speed limiting unit 10 so as to easily mount intermediate its ends a gear 18. The gear 18 is fixed to and rotates uniformly with the shaft 14 and is driven by a gear 20 in mesh therewith, this gear mounted on a shaft 22 also extending inwardly into the case 16 and having at its outward end the necessary connections (not shown) for the cable to the speedometer or transmission (not shown).

A bracket 24 is mounted rigidly with the gear 18 so as to rotate with it at the speed dictated by the shaft 14. The bracket 24 pivotally mounts a pair of weights 26, 26 mounted respectively at the outer ends of the bracket so that, upon rotation of the gear 18 and bracket 24, weights 26, 26 pivot outwardly due to centrifugal force. Each of the weights 26, 26 includes an inwardly extending portion 28 disposed substantially at right angles to the major portion of the weight 26 which engages a generally hat shaped element 30 mounted loosely on the shaft 14. Hat shaped element 30, because of the looseness of the fitting between it and shaft 14 is capable of longitudinal sliding movement telescopically over shaft 14, its position on the shaft 14 being dictated by the outward pivoting of the weights 26 and the resulting engagement of the inwardly extending portions 28, 28 of the weights 26, 26 with the hat shaped element 30.

At its leftward end the hat shaped element 30 includes at least one bracket arm 32 providing a mounting means for a pivot pin 36 which, in turn, pivotally connects a thrust link 38 to the hat shaped element 30 so that the thrust link 38 extends generally axially relative to the shaft 14 and prevents the hat shaped element from tending to rotate with the shaft 14.

A leaf spring 39 is mounted by screw means or the like to a mounting block 41, attached to the case 16, so as to extend inwardly of the case 16 and radially relative to the shaft 14 to engage and abut an inner, leftward end 43 of the bracket arm 32 of the hat shaped element 30. The leaf spring 39 acts so as to urge the hat shaped element 30 in a direction opposite to the force applied thereto by the rotating pivoted weights 26, 26 and is calibrated so that movement of the hat shaped element 30 inwardly (leftwardly) on the shaft 14 is closely controlled and limited to the desired extent until a specified maximum speed of the vehicle is reached.

Thrust link 38, at its opposite end, has a pivot pin 40 rigidly mounted therewith. This pivot pin extends in a vertically extending slot 42 in an extension 44 of a valve plate 46. This valve plate is pivotally mounted on a platelike element 48 of generally rectangular shape which may conveniently form the bottom side or end of the case 16, with the platelike element 48 and valve plate 46 disposed in confronting and abutting relation. Such pivotal and abutting mounting is accomplished by a pivot pin 50 which extends into and is rigid with the platelike element 48.

An abutting and rearward face or side 52 of the valve plate 46 includes an arcuately disposed passageway 54 formed therein that extends inwardly into the valve plate proper so as to complete formation of the passageway, such passageway, as is standard practice, is conventionally formed by milling or the like. Passageway 54 is disposed so that its centerline is on a radius having as its center the center of the pivot pin 50 and is of sufficient length so as to provide communication between a series of three ports 56, 58 and 60 opening inwardly from the platelike element 48 to the face 52 of the valve plate 46 so as to all communicate with passageway 54. Port 56 also communicates with a passageway 62 formed by a right angled bore in the platelike element 48, this passageway extending outwardly of the case 16 to communicate with an air filter 64 mounted on the case 16. Passageway 62 thereby provides an entrance for atmospheric pressure to the port 56. Port 58 opens inwardly into platelike element 48 to communicate with a passageway 66 formed by a bore in the platelike element, this passageway merging into a fitting 68 extending outwardly of the casing 16 and providing easy connection for a hose 70 that extends to a vacuum bellows 72 provided for throttle actuation. Port 60 opens inwardly into platelike element 48 and merges with a passageway 74 formed by a right angled bore in the platelike element 48. Similarly to passageway 66, passageway 74 communicates with a fitting 76 extending outwardly of the casing 16 and then provides easy connection for a hose 78 that leads to and is connected to the vehicle manifold system (not shown) to thereby provide a vacuum source of pressure for the upper speed limiting unit 10.

An operating bellows 72 is resiliently urged in a throttle opening direction, by a spring means disposed therein (not shown) the operating bellows being connected to a carburetor throttle link 82 through the aegis of a thrust link 84. The thrust link 84 is directly mounted to the movable diaphragm (not shown) of the operating bellows 72 so as to move inward and outward with it, and, at its other end, is pivotally connected to the throttle link 82 by a pivot pin 86 disposed in the throttle link 82.

The carburetor throttle link 82 is rigidly attached and mounted, below its connection with the thrust link 84, on a carburetor shaft 90 that forms its pivotal point so that the carburetor link 82 may pivot freely with the shaft 90. The carburetor shaft 90, in turn, has mounted thereon a conventional butterfly valve 91. A resilient torsional spring 92 is also disposed on the shaft 90 proximate its outer end 93. This spring has its opposite ends abutting a pin 94 mounted rigid with a shaft 97 and a transversely extending tang 95 mounted rigid with the carburetor throttle link 82. In this way a resilient torsional urging means is provided between shaft 90, through the carburetor throttle link 82, and the shaft 97.

The shaft 90, at its outer end 93, is provided with a smaller diameter section 99 which conveniently nestles in and is bearingly received in a bore 101 formed in the adjoining end of shaft 97 to provide a piloting means for the shaft 97 and to place the shafts 90, 97 on a single axial centerline By this arrangement it should be clear that the shaft 90 may rotate relative to the shaft 97 by imposing a torsional force on the torsional spring 92 as these two shafts are rotated in opposite directions.

Mounted outwardly of the carburetor throttle link 82, on the shaft 97, is a throttle thrust link 98. This link is rigidly attached to the shaft 97 so movement of it in either a clockwise or counterclockwise direction occasions a similar movement to the shaft 97. Link 98 is attached by any conventional linkage means 100 which extends to and is pivotally connected to the vehicle floor throttle pedal 102 conveniently mounted for operation by the driver of the vehicle. A throttle return spring 104 is also conveniently and conventionally attached to the throttle link 98 to urge the throttle link 100 into a decelerating condition.

A right angled extension 103 formed with the throttle thrust link 98 extends therefrom so that its major axial extent is parallel to and radially displaced from the shafts 90, 97. The right angled extension 103 of the throttle thrust link 98 terminates adjacent the location of the link 82 and has formed, at this end, an abutment 105 which extends substantially at a right angle to the right angled extension 103 so as to engage carburetor throttle link 82 when the carburetor throttle link is urged to this position by the resilient torsional spring 92. Thus, the link 82 is resiliently urged into abutment with throttle thrust link 98 unless moved counterclockwise by the bellows 72.

The operation of the upper speed limiting unit 10 now may be easily described. Operation of the vehicle provides a particular rotary speed to the shaft 14 causing the pivoting weights 26, 26 to move outwardly to urge the hat shaped element 30 axially leftwardly on the shaft 14. This movement of hat shaped element 30 is in opposition to the leaf spring 39 so that only a slight movement of the hat shaped element 30 occurs prior to the vehicle obtaining the maximum speed set in the leaf spring 39. Upon reaching this speed the rightward opposing force of the leaf spring 39 is overcome and the thrust link 38 moves sufficiently far leftwardly to pivot the valve plate 46 clockwise and interrupt any communication between the atmospheric port 56 and the arcuately shaped passageway 54, thus, only vacuum or negative pressure is communicated from the manifold supply through the hose 78, channel 74, port 60, port 58, channel 66 and hose 70 to the operating bellows 72. Vacuum pressure imposition on the bellows 72 causes a leftward collapse of this bellows, moving the carburetor throttle link plate 82 in a counterclockwise throttle closing direction overcoming the torsional force of torsion spring 92. Actuation of the throttle pedal 102 and consequent movement of the throttle thrust link 98 clockwise by the vehicle operator attempting to override the positioning of the carburetor throttle link 82, has no effect since the force offered by the operating bellows 72 is of sufficient magnitude to counter the torsional force of torsion spring 92 so that this spring merely winds relative to the shaft 90 and 97 permitting the throttle thrust link 98 to move clockwise without effect on the positioning of the carburetor throttle link 82.

While only a single embodiment of this invention is shown and described it will be readily apparent to one skilled in the art that many changes can be made thereto without departing from the scope and obvious equivalents to this invention.

I claim:

1. In an upper speed limiting unit, the combination comprising; (a) a speed sensing means having a portion movable proportional to vehicle speed, (b) a calibrated spring means disposed so as to oppose movement of said portion, (c) a valve plate means, (d) connecting means between said valve plate means and said portion, (e) a platelike element disposed in abutting relation with said valve plate means, (f) a plurality of port means in said platelike element, (g) a passageway means in said valve communicable with all of said port means, (h) a plurality of pressure source means communicating with at least some of said ports, (i) a throttle operating bellows means communicating with at least one of said port means, (j) whereby said throttle operating bellows limits the upper speed of a vehicle.

2. The combination of claim 1 wherein a link means is attached to said throttle operating bellows means at one of its ends and to a carburetor operating link at its other end.

3. The combination set out in claim 2 wherein a torsional spring means is disposed between said carburetor operating link and a manual throttle operating means whereby the force imposed on said carburetor link by said throttle operating bellows may override the force imposed by said manual throttle operating means.

4. The combination of claim 1 wherein a link means is disposed in series to said throttle operating bellows and a carburetor operating link.

5. In a speed control unit, the combination comprising; (a) a pivotal valve plate, (b) a platelike element disposed in abutting relationship with a face of said pivotal valve plate, (c) an arcuate passageway in said valve plate, (d) a series of three ports in said platelike element in communication with said arcuate passageway, (e) a series of three passageways in said platelike element, each of said passageways communicating with one of said ports (f) a pair of said series of three passageways communicating outwardly with a pair of pressure sources, (g) said pressure sources being of differing magnitudes relative to each other, (h) the other of said passageways communicating with said operating bellows, (i) whereby movement of said valve plate relative to said ports in said platelike member controls the operation of said throttle operating bellows.

6. In an upper speed limiting unit, the combination comprising; (a) a pair of rotating counterweights driven by means rotatable in proportion to a vehicle speed, (b) said counterweights being pivoted so as to move outwardly centrifugally upon rotation, (c) radially, inwardly extending portions on said counterweights engageable with a member movable axially relative to the rotation of said counterweights, (d) a link pivotally attached to said axially movable member at one of its ends (e) the other end of said link pivotally attached to a valve plate capable of arcuate movement, (f) said valve plate having a face having an arcuate passageway disposed therein, (g) a plate like element disposed in abutting relationship with said face, (h) a series of three ports in said plate like element opening towards and communicating with said arcuate passageway, (i) the first of said ports merging into a first passageway disposed in said plate like element, (j) the second of said ports merging into a second passageway disposed into said plate like element, (k) the third of said ports merging into a third passageway disposed into said plate like element, (l) the first of said passageways communicating outwardly with the vacuum source (m) the second of said passageways communicating outwardly with an operating bellows, (n) the third of said passageways communicating outwardly with an atmospheric pressure source, (o) a spring means disposed so as to provide a force against movement of said axially movable member, (p) whereby said link moves said valve plate upon the overcoming of said spring force so as to provide only a vacuum pressure to said operating bellows.

7. The combination set out in claim 6 wherein said operating bellows is connected to a link movable linearly as the operating bellows moves, (b) said link being connected to a carburetor operating link.

8. The combination set out in claim 7 wherein a torsional override means is provided between said carburetor operating link and a manual throttle operator means.

9. The combination set out in claim 8 wherein the spring means is a leaf spring calibrated so as to limit the movement by said member until an upper set speed of the vehicle is reached.

10. In a speed control unit, the combination comprising; (a) a movable valve plate, (b) a platelike element disposed in abutting relationship with a face of said movable valve plate, (c) a passageway in said valve plate, (d) a series of three ports in said plate like element in communication with said passageway, (e) a series of three passageways in said platelike element, each of said passageways communicating with one of said ports, (f) a pair of said series of three passageways communicating outwardly with a pair of pressure sources, (g) said pressure sources being of differing magnitude relative to each other, (h) the other of said passageways communicating with said operating bellows, (i) whereby movement of said valve plate relative to said ports in said platelike member controls the operation of said throttle operating bellows.

11. In an upper speed limiting unit, the combination comprising; (a) a pair of rotating counterweights driven by means rotatable in proportion to a vehicle speed, (b) said counterweights being pivoted so as to move outwardly centrifugally upon rotation, (c) radially, inwardly extending portions of said counterweights engageable with a member movable axially relative to the rotation of said counterweights, (d) a link attached to said axially movable member at one of its ends, (e) the other end of said link attached to a valve plate capable of arcuate movement, (f) said valve plate having a face having an arcuate passageway disposed therein, (g) a platelike element disposed in abutting relationship with said face, (h) a series of three ports in said platelike element opening towards and communicating with said arcuate passageway, (i) the first of said ports merging into a first passageway disposed in said platelike element, (j) the second of said ports merging into a second passageway disposed in said platelike element (k) the third of said ports merging into a third passageway disposed in said platelike element, (l) the first of said passageway communicating outwardly with a vacuum source, (m) the second of said passageways communicating outwardly with an operating bellows, (n) the third of said passageways communicating outwardly with an atmospheric pressure source, (o) a spring means disposed so as to provide a force against movement of said axially movable member, (p) whereby said link means moves said valve plate upon the overcoming of said spring force so as to provide only a vacuum pressure to said operating bellows.

12. A speed control unit including; (a) a pivotal valve having at least one face, (b) a passageway extending arcuately in said face, (c) a plate like element disposed in abutting relation to said face (d) a series of ports disposed in said platelike element communicating with said passageway, (e) a series of passageways extending outwardly through said platelike element and communicating with said ports, (f) a throttle operating bellows, (g) a carburetor operating link, (h) a throttle linkage and (i) a linkage means disposed in series between said carburetor operating link and said throttle operating bellows.